United States Patent [19]
Guerro et al.

[11] Patent Number: 5,346,947
[45] Date of Patent: Sep. 13, 1994

[54] WATER SOLUBLE BINDER COMPOSITIONS CONTAINING BETA-HYDROXY URETHANES AND POLYFUNCTIONAL CARBOXYLIC ACIDS

[75] Inventors: Gerald J. Guerro, Trumbull; William Arthur; Balwant Singh, both of Stamford, all of Conn.

[73] Assignee: Cytec Technology Corp., Wilmington, Del.

[21] Appl. No.: 832,133

[22] Filed: Feb. 6, 1992

Related U.S. Application Data

[62] Division of Ser. No. 362,908, Jun. 8, 1989.

[51] Int. Cl.$^5$ .......................... C08J 3/00; C08K 3/20; C08L 75/00; C08F 20/00
[52] U.S. Cl. ........................... 524/591; 524/590; 524/839; 525/411; 525/418; 525/419; 525/437; 525/440; 525/454; 525/127; 528/44; 528/60; 528/84; 528/73; 528/74; 528/75
[58] Field of Search ............... 524/112, 199, 590, 591, 524/839; 528/44, 60, 84, 73, 74, 75; 525/411, 418, 419, 437, 454, 127, 440

[56] References Cited

U.S. PATENT DOCUMENTS

| | | | |
|---|---|---|---|
| 3,661,819 | 5/1972 | Koral et al. | 524/512 |
| 4,158,574 | 6/1979 | Cummisford et al. | 127/32 |
| 4,588,787 | 5/1986 | Kordomenos et al. | 525/457 |
| 4,708,984 | 11/1987 | Forgione et al. | 525/440 |

Primary Examiner—Paul R. Michl
Assistant Examiner—P. Niland
Attorney, Agent, or Firm—Bart E. Lerman; Michael J. Kelly; Claire M. Schultz

[57] ABSTRACT

The binder composition of this invention contains a beta-hydroxy urethane functional material and a polycarboxylic acid. Coated glass fibers are prepared by contacting said fibers with the binder composition of the invention and thereafter curing the composition. This invention is also an improved method of treating glass fibers by contacting them with the improved binder composition of the invention.

15 Claims, 1 Drawing Sheet

WATER SOLUBLE BINDER COMPOSITIONS CONTAINING BETA-HYDROXY URETHANES AND POLYFUNCTIONAL CARBOXYLIC ACIDS

This is a divisional of co-pending application Ser. No. 07/362,908, filed on Jun. 8, 1989.

BACKGROUND OF THE INVENTION

Phenol-formaldehyde resin binders are routinely used for commercial applications involving siliceous materials because of their low cost and availability. These resins are sold as aqueous solutions that contain free formaldehyde. Moreover, phenolic resins may emit formaldehyde upon heat curing and storage.

Fibers, particularly glass fibers, benefit from treatment with binders. The self-abrasion of glass fibers is known to cause surface defects which reduce their mechanical properties. Conventional treatment is to spray resin binder formulations onto glass fibers immediately after fiberization or attenuation. The resin binder protects the fiber and gives dimensional stability to structures formed from a multiplicity of fibers by fixing or immobilizing junction points between fibers.

An important use of glass fiber is in the manufacture of fiberglass insulation, either in the form of mats or fiber agglomerates. Coated fiberglass is conventionally fabricated into fiberglass insulation in high speed processes. These highly automated fiberglass forming processes require a binder having a combination of important properties.

Commercial prior art binders are based upon various resins such as phenol-formaldehyde resins and melamine formaldehyde resins. Such resins are typically provided in aqueous solutions containing free formaldehyde. These phenol-formaldehyde resins are water soluble, must be refrigerated before use, and are oven cured at about 177° C. to about 288° C.

A shortcoming of the prior art binder resins is that they tend to emit formaldehyde during application and storage. In particular, formaldehyde is emitted during the manufacture of fiberglass insulation. Additionally, the decomposition tendencies of the prior art phenolic resins are aggravated when stored under conditions of heat and humidity.

It is desirable to develop fiberglass binders which have reduced formaldehyde emission levels and are suitable for the treatment of siliceous substrates such as fiberglass.

FIELD OF THE INVENTION

This invention relates to water soluble fiberglass binder formulations, glass fibers treated with binder formulations, and processes for making fiberglass mat insulation.

SUMMARY OF THE INVENTION

Novel binder formulations of this invention contain as essential ingredients (1) a beta-hydroxy urethane functional material and, (2) a polycarboxylic acid.

This invention also includes coated glass fibers which are prepared by contacting glass fibers with the binder composition of the invention and thereafter curing the composition.

This invention is also an improved method of treating glass fibers by contacting them with the improved binder compositions of the invention.

THE DRAWING

The drawing (FIG. 1) shows a fiberglass mat forming process.

DETAILED DESCRIPTION OF THE INVENTION

I. THE NOVEL BINDER COMPOSITIONS OF THE INVENTION

Figure 1:
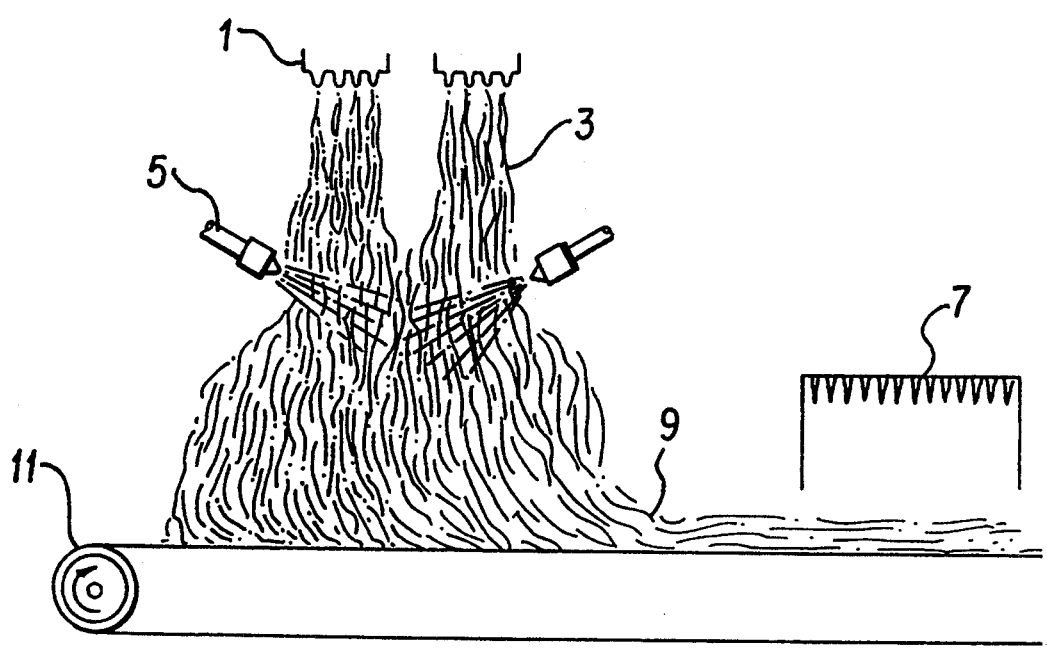

The binder composition of the invention contains two essential ingredients, namely, (i) a beta-hydroxy urethane functional material, and (ii) a polycarboxylic acid.

A. The beta-hydroxy urethane functional material

The beta-hydroxy urethane containing materials are characterized by the general structure:

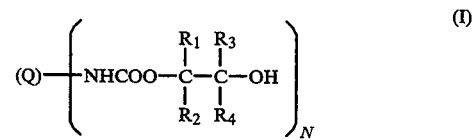

wherein R1, R2, R3, or R4 may be the same or different and are hydrogen or alkyl radicals, n is an integer of 2 or more and preferably 3 or more, and Q is any molecular backbone having the structure (I) appended to it.

A preferred class of beta-hydroxy urethane materials is described in U.S. Pat. No. 4,708,984 the disclosure of which is incorporated herein by reference. A particularly preferred beta-hydroxy urethane material is a statistical distribution of poly(hydroxypropylcarbamylmethyl)melamines. The preparation of such mixtures is taught in U.S. Pat. No. 4,708,984 and is identified in the remainder of this specification as "6-HPC".

In addition, beta-hydroxy urethanes suitable for the practice of this invention are described in the following patents:

U.S. Pat. No. 4,110,667
U.S. Pat. No. 4,284,750
U.S. Pat. No. 4,419,407
U.S. Pat. No. 4,435,559
U.S. Pat. No. 4,451,622
U.S. Pat. No. 4,533,704
U.S. Pat. No. 4,535,132
U.S. Pat. No. 4,542,173
U.S. Pat. No. 4,588,787
EPO Patent Appln. No. 280815

Suitable beta-hydroxy urethanes also include the following:

1. triazine compounds of the formula
   $C_3N_6 (CH_2OR)_{6-x}(CH_2NHCOOR_1)_x$
2. benzoguanamine compounds of the formula
   $C_3N_5 (C_6H_5) (CH_2OR)_{4-y}(CH_2NHCOOR_1)_y$
3. glycoluril compounds of the formula
   $C_4H_2N_4O_2 (CH_2OR)_{4-y} (CH_2NHCOOR_1)_y$
4. acetoguanamine compounds of the formula
   $C_3N_5 (CH_3) (CH_2OR)_{4-y}(CH_2NHCOOR_1)_y$
5. 4,5-dihydroxy-2-imidazolidone compounds of the formula
   $C_3H_4N_2O_3 (CH_2NHCOOR_1)_2$
6. an oligomer of (1) or (2) or (3) or (4) or wherein the R groups are, independently, hydrogen or alkyl from 1 to 12 carbon atoms, and the $R_1$ groups are, independently, beta-hydroxyalkyl, of from 2 to 18 carbon atoms, alone, or combined with alkyl of from 1 to 18 carbon atoms, x is in the range of from about 2 to 6, and y is in the range of from about 2 to 4.

These beta-hydroxy urethane containing materials are self-crosslinking since they contain both reactive hydroxyl and blocked isocyanate groups. Illustrative beta-hydroxy urethane compounds suitable for preparing the binder formulations of this invention are the following:

hydroxypropyl carbamylmethylated melamine
hydroxyethyl carbamylmethylated melamine
hydroxypropyl carbamylethylated melamine
hydroxyethyl carbamylethylated melamine
hydroxypropyl carbamylmethylated benzoguanamine
hydroxyethyl carbamylmethylated benzoguanamine
tetrahydroxypropyl carbamylethylated mono-chloro triazine
tetrahydroxyethyl carbamylethylated mono-chloro triazine
tetrahydroxypropyl carbamylmethylated glycoluril
tetrahydroxyethyl carbamylmethylated glycoluril
dihydroxypropyl carbamylmethylated dihydroxyimidazidone
dihydroxyethyl carbamylmethylated dihydroxy imidazolidone and are further illustrated by the compounds:
hexa-(hydroxypropyl carbamylmethylated) melamine
hexa-(hydroxypropyl carbamylethylated) melamine, hereinafter called, "HPCM"
1-chloro-3,5,bis-(hydroxypropyl carbamylethylated) amino) triazine (abbreviated, "TPCT")
1,7-di(hydroxypropyl carbamylethylated) diethylenetriamine ("DETA-PC")
1,10,-di(hydroxypropyl carbamylethylated) triethylenetetraamine ("TETA-PC")

The essential requirement of the beta-hydroxy urethane binder ingredient of the composition is that it be able to at least partially crosslink or gel to a resinous or semi-resinous state before heat curing under the precure conditions of time and temperature used in the fiberglass mat fabrication. Cure of the preformed fiberglass mat is typically done at temperatures of from about 177° C. to about 288° C. for a period of from one-half minute to five minutes.

B. The Polycarboxylic Acid Ingredient

The essential polycarboxylic acid ingredient of the composition of the invention may contain either a polycarboxylic acid or compounds which form polycarboxylic acids under curing conditions. The polycarboxylic acid may be any aliphatic, alicyclic, aromatic, or heterocyclic organic compound having two or more reactive acid groups. Acid anhydrides which hydrolyze in the presence of water to give polycarboxylic acids are defined to be polycarboxylic acid ingredients for the purpose of this invention.

It is a discovery of this invention that polycarboxylic acids generally have utility in the binder compositions described herein. However, it is an important additional discovery of this invention that several specific polycarboxylic acids show highly advantageous and unexpectedly superior binder tensile test properties when used in the binder composition of this invention. Specifically, the following polycarboxylic acids are used in the preferred practice of this invention:

(a) 1,2,3,4-butanetetracarboxylic acid (BTCA)
(b) 1,2,3,4-butanetetracarboxylic acid anhydride
(c) 1,2,3,4-cyclopentane-tetracarboxylic acid
(d) 1,2,3,4-cyclopentane-tetracarboxylic acid anhydride
(e) pyromellitic acid
(f) pyromellitic dianhydride
(g) maleic acid
(h) maleic anhydride
(i) polymaleic acid
(j) polymaleic anhydride
(k) 1,2,3,4-cyclopentanetetracarboxylic acid anhydride
(l) 2,3,4,5-tetrahydrofuran carboxylic acid
(m) 2,3,4,5-tetrahydrofuran carboxylic acid anhydride
(n) and mixtures of these acids and anhydrides.

C. The Essential Ingredients in Combination

The relative proportions of essential ingredients in the formulation of the invention is a beta-hydroxy functional material to polycarboxylic acid ingredient weight ratio of from about 4:1 to about 1:5, with a preferred ratio range of from 2:1 to 1:4.

Generally, the essential ingredients in combination constitute about 50 or more weight percent of the total weight of the formulation ingredients (exclusive of water).

The essential ingredients of the binder formulation are generally formulated in a concentrated form suitable for shipment and storage. Before use the binder composition is diluted with water for application to the desired substrate, such as fiberglass. Typically, binder compositions are thirty to sixty percent by weight aqueous concentrated solutions. However, it is also possible to ship and store the binder compositions as a mixed power, paste, suspension, emulsion, or solution. Moreover, although aqueous solutions are generally the most convenient and economical form of binder composition it is possible to dissolve the binder ingredients in solvents other than water. Suitable solvents include polar solvents highly miscible in water, such as alcohols, aldehydes, ketones, alone, in admixture or with water as a cosolvent.

D. Optional Formulation Ingredients

1. Gel Time Modifiers (Auxiliary Crosslinkers)

An optional but useful addition to the formulation of the invention is a gel time modifier.

For certain applications and techniques of fiberglass processing it is necessary to give some initial strength to the formulation so that it will hold in place and have a very limited binding action when sprayed onto the fiberglass. To promote such action a gel time modifier/auxilliary crosslinker may be included in the formulation.

Suitable gel time modifiers include boric acid and its salts such as ammonium and sodium borates, triethanol amine borates, triethyl amine borates, certain zirconium salts such as ammonium zirconium carbonate, $ZrOCl_2$, certain aldehydes and their acetals such as glyoxal, glyoxylic acid, ethers of acrylamidoglycolic acid and esters such as described in U.S. Pat. No. 4,656,308 and including MAGME ® methyl-acrylamidoglycolate methyl ether monomer (product of American Cyanamid Company), and amino resins such as melamine-formaldehyde resins such as CYMEL ® 303, CYMEL ® 300, CYMEL ® 385, CYMEL ® 373, CYMEL ® 405, CYMEL ® 412, and glycolurils such as tetramethylol glycoluril (CYMEL® 1172,) tetrabutoxymethyl glycolurils (CYMEL® 1170), dimethoxydiethoxymethyl glycoluril (CYMEL® 1171) (all CYMEL® resins are products of American Cyanamid Company, Wayne N.J.), and such resins in combination with bisacrylamidoethyleneglycol, methylolated polyacrylamide, and dimethyloldihydroxyethyleneurea.

The choice of gel time modifier and its concentration in the formulation is dependent on the end-use application and the other formulation ingredients. In general, anywhere from 1 to 10 weight percent of the gel time modifier is added based on the weight of the total formulation, with additions of from 2 to 5 weight percent being preferred.

2. Viscosity (Flow) Modifiers

These materials are generally low molecular weight polar materials which break up hydrogen bonding and thereby increase resin "flow" by reducing viscosity in the pre-cure stage. Examples of such polar materials are urea, dicyanamide, propylene carbonate, ethylene carbonate, and certain glycols such as ethylene and propylene glycol and their derivatives, and low to medium molecular weight difunctional polyols such as polyethylene glycol, polytetrahydrofuran and the like. These additives may be used in amounts from 1 to 30 weight percent, with a preferred range being from 3 to 15 weight percent.

3. Adhesion Promoters/Coupling Agents

Adhesion promoters include materials such as silicones, (e.g., trialkoxyaminopropylsilane). These materials are generally used at concentrations of from about 0.1 to about 5 weight percent in the binder composition.

4. Stiffening Agents

Exemplary stiffening agents are pentaerythritol, and tris-hydroxyethyl cyanuric acid (TEECA), along with poly- and mono- saccharides such as starch, hydroxyethyl cellulose, gums, and simple sugars like glucose, sorbitol, inositol, and mixtures of the above.

5. Dust Suppressants

Antidusting compounds for fiberglass applications are oils and oil-water emulsions. These materials are generally used at concentrations of from about 2 to about 5 weight percent in the binder composition.

6. Catalysts

Binder formulations containing carboxylic acids are self-catalyzed. However, the inclusion of a catalyst may accelerate or promote curing properties of the binder formulation. Suitable catalysts include (i) Bronsted acids, such as nitric, phosphoric or para-toluene sulphonic acid; (ii) Lewis acids, such as zinc chloride, zirconium ammonium carbonate, (iii) titanium chelates (acetylacetonate, ethylacetoacetate, triethanolamine, lactic acid ammonium salt), and (iv) dialkyltin diisothiocyanates.

7. Other Ingredients

A wide variety of other ingredients may be used in the formulation such as the following:
pH modifiers
colorants
pigments
odorants Examples of pH modifiers are triethylamine, triethanolamine, 1,4-diazabicyclo(2,2,2)octane, and the like. Examples of fillers are Cab-O-Sil® fumed silica (product of Cabot Corporation), clays such as bentonite, titanium dioxide, and talc.

II. METHOD OF MAKING FIBERGLASS INSULATION FROM THE NOVEL BINDER COMPOSITIONS OF THE INVENTION

An important use of glass fiber is in the manufacture of fiberglass insulation.

Coated fiberglass is conventionally fabricated into fiberglass insulation in a high speed process of (1) forming the glass fiber and treating it with a binder formulation, (2) forming the non-woven random mat on a belt, (3) curing the binder treated mat to give shape and permanence, and (4) finally fabricating and packaging the mat for distribution and sale. This highly automated fiberglass forming process requires a binder having an important combination of properties. An excellent review of prior art fiberglass insulation manufacturing technology is found in the textbook, Fiberglass, by J. Gilbert Mohr and William P. Rowe (1978), published by Van Nostrand Reinhold Company, New York, N.Y., ISBN 0-442-25447-4.

A method of making fiberglass mat using the binder composition of the invention is found by reference to FIG. 1. In the FIGURE molten glass issues from multiple orifices (1) and cools to form glass fibers (3). An aqueous binder solution is sprayed from nozzle (5) onto the glass fibers which fall onto conveyer belt (11) and are continuously removed as a fiberglass mat (9) and cured by passing through oven (7). The process may be modified by expanding the fiberglass mat with air jets before entry into the curing oven.

The use of the word, "binder" composition to describe the compositions of this invention should be understood to include deposition both onto the fiber itself (viz., coating) and deposition at the junction of the fibers. Thus, both a coating and structure stabilizing effect is produced by coating fiberglass with the binder compositions described herein.

For actual application to fiberglass the binder compositions of this invention are diluted to about 5 to about 15 weight percent solids to achieve a concentration of solids on the fiberglass of from about 3 to about 10 weight percent.

The binder compositions of the invention are desirably used as the sole binder for making fiberglass mat. However, if desired, the compositions may be used for partial replacement of the phenol-formaldehyde or urea formaldehyde resins conventionally used as binders for fiberglass mat production. The benefits of formaldehyde reduction will be proportional to the degree of substitution of the binder composition of the invention that is used. It is preferred that the binder composition of this invention constitute at least 50 weight percent of the total binder used in the manufacture of fiberglass mat.

The binder compositions may be applied to the fiberglass mat substrate by any conventional method such as spraying, brushing, dipping, padding, and etc.

III. COATINGS AND ARTICLES FORMED FROM THE NOVEL BINDER COMPOSITIONS OF THE INVENTION

The binder formulations of the invention described in section (I) above have general utility for binding siliceous materials into solid objects or articles. Alternatively, the binder formulations are useful for coating siliceous materials.

Siliceous material capable of combination with the binder compositions of the invention are typified by but not limited to the following:
- glass shot
- continuous glass monofilament
- rock wool
- quartz sand, sheet, crystal, glass
- micas
- garnet or other abrasives
- ceramics The preferred embodiment of this invention is a novel and improved fiberglass mat insulation formed from fiberglass treated with from about three to about ten weight percent of the binder formulation described herein. It has been discovered that this treated fiberglass has, at most, very low levels of formaldehyde emitted during its formation, storage and use.

The following Examples illustrate the practice of the invention.

EXAMPLE 1

This Example illustrates various fiberglass binder formulations containing the two essential ingredients; (i) a beta-hydroxy urethane functional material, and (ii) polyfunctional carboxylic acid crosslinker.

An important use of glass fiber is in the manufacture of fiberglass insulation. It is believed that tensile tests using dogbone shaped samples formed from glass bead and the binder compositions of this invention are predictive of utility for fiberglass binding in the manufacture of fiberglass mat.

PART A

This part of the example shows various polycarboxylic acids used in combination with a preferred beta-hydroxy urethane material, specifically, 6-HPC. The following laboratory test procedure adapted from foundry sand binder testing methods was used:

Laboratory Test Method for Evaluating Fiberglass Binders

A mixture of 4.0 grams of 75% by weight solids aqueous 6-HPC (3.0 grams of solids) was combined with 2.0 grams of BTCA to give a 60:40 w/w mixture of the two materials. This mixture was diluted with water to a total weight of 16.0 grams. To the solution was added 100 grams of Glas-Shot ® Glass Bead Abrasive, product of Ferro Corporation. The mixture was well mixed by stirring, and then packed tightly into dogbone shaped mold pieces (mold obtained from Dietert Detroit Products Company) with a ¼ inch by 1 inch (0.635 cm. by 2.54 cm.) cross section at the neck. The shaped pieces were transferred to 1/16th inch (0.159 cm.) aluminum sheets, whereon they were cured in an oven at 180° C. for 20 minutes. The test pieces were then cooled for at least 20 minutes, after which a set of three such pieces was broken in tension on an Instron Engineering Company Tensile Tester (Model TTB) using dogbone grips supplied by Dieteft Detroit Products Company. The average tensile breaking strength of the three test pieces was 389 pounds, 1556 psi. (176 kilograms, $10.727 \times 10^6$ pascals). The cross head speed of the tensile tester was 0.1 inch (0.254 cm.) per minute.

Test results using various acid crosslinkers with 6-HPC (beta-hydroxy urethane functional material) are shown in Table I below:

TABLE I

| Acid Crosslinker 40% by wt. | beta-hydroxy urethane 60% by wt. | pH | Tensile kg. | Color* |
|---|---|---|---|---|
| Control Phenolic Resin 100% | | 7.5 | 132 | Y |
| 1,2,3,4-Butane-tetracarboxylic acid | 6-HPC | 2.1 | 176 | W |
| 1,2,3,4-Cyclopentane tetracarboxylic acid | 6-HPC | 2.0 | 165 | W |
| Pyromellitic Anhydride | 6-HPC | 1.8 | 92 | OW |
| Polymaleic Acid | 6-HPC | 1.9 | 93 | OW |
| Epiclon B-4400*** | 6-HPC | 2.2 | 50 | Y |
| Maleic Anhydride | 6-HPC | 1.1 | 49 | B |
| Tetrahydrofuran-2,3,4,5-tetracarboxylic acid | 6-HPC | 1.8 | 46 | Y |
| Polyacrylic Acid | 6-HPC | 3.3 | 31 | OW |
| Adipic Acid | 6-HPC | 2.8 | 3.6 | W |
| Glutaric Acid | 6-HPC | 2.5 | 1.4 | W |
| Phthalic Anhydride | 6-HPC | — | 13 | OW |
| Tetrahydrophthalic Anhydride | 6-HPC | 2.5 | 10 | W |
| EDTA**** | 6-HPC | 2.8 | 6.8 | W |
| Hemimellitic acid | 6-HPC | 1.9 | 18 | W |
| Lactic acid** | 6-HPC | 3.5 | 6.8 | B |
| Tartaric acid** | 6-HPC | 3.5 | 29 | B |

*Color: W is white, OW is off-white, Y is yellow, B is brown.
**Acid crosslinker is 50% by weight, pH adjusted with triethylamine
***Epiclon B-4400 (Dainippon Ink and Chemicals) is the reaction product of 2 moles of maleic anhydride and piperylene
****EDTA is ethylenediaminetetraacetic acid It is unexpected that the first seven acids listed after the prior art control phenolic resin gave tensile properties significantly higher in binder compositions than other polycarboxylic acids. It is a discovery of this invention that certain acids are surprisingly efficacious in binder compositions for glass while compounds with similar polycarboxylic functionality have comparatively limited utility.

PART B

The Examples in this section were run in the same way as in Part A, supra, with the same total weight solids, except that the identity of the carbamate and the ratio of the reactants was varied as specified in the following Table II. Included for comparison are other polyhydroxy compounds.

TABLE II

| Hydroxy Component (A) | Acid Crosslinker (B) | Wt. Ratio (A):(B) | pH | Tensile kg. |
|---|---|---|---|---|
| 6-HPC | BTCA | 60/40 | 2.1 | 176 |
| TPCT | BTCA | 60/40 | 2.0 | 166 |
| DETA-PC | MALEIC | 50/50 | — | 18 |
| DETA-PC | BTCA | 60/40 | 3.9 | 165 |
| DETA-PC | BTCA | 50/50 | — | 127 |
| HPCM | BTCA | 60/40 | 3.3 | 128 |
| HPC* | BTCA | 50/50 | — | 11 |
| METHYLENE--BIS-HPC** | BTCA | 50/50 | — | 21 |
| TMP ®-130 (polyol) | BTCA | 70/30 | — | 23 |
| QUADROL ® (polyol) | BTCA | 70/30 | — | 38 |
| INOSITOL | BTCA | 60/40 | — | 22 |

*HPC = Hydroxy propyl carbamate
**Methylenebis-HPC (reaction product of HPC with formaldehyde
TMP ®-130 and QUADROL ® = Registered trademark BASF Corp.

This part of the Example shows that a variety of polyfunctional beta-hydroxy urethanes are effective in giving good tensile strengths with the preferred polycarboxylic acids of the invention (e.g., BTCA). The last three ingredients of TABLE II are given for comparison purposes only, since they form polyesters and not the urethanized polyesters formed by the essential ingredients of the binder composition of the invention.

EXAMPLE 2

PART A

Two of the binder formulations comprising 6-HPC/BTCA and 6-HPC/maleic anhydride as the essential ingredients were tested in a fiberglass production facility to correlate laboratory data and testing procedures with plant performance. The binders were diluted to an average 6–10% by weight solids and applied to fiberglass at a 4% to 7% resin level (solids basis). The fiberglass was deposited on a belt and blown to the desired thickness. The binder formulations used and the physical properties of the mat fiberglass insulation produced are set out in this Example.

The following binder composition was prepared:

| Ingredient | Wt. % |
|---|---|
| 6-HPC | 49.76 |
| BTCA | 32.05 |
| Propylene Carbonate | 9.56 |
| Sorbitol | 4.78 |
| CYMEL ® 1172* | 2.87 |
| Urea | 0.95 |

*CYMEL ® 1172 is a tetramethylolglycoluril, a product of American Cyanamid Company The above formulation designated as No. 1 was prepared at a solids concentration of 40% by weight in water and diluted before use to a binder concentration of 9% by weight with silane coupling agent added prior to use.

The following Table III illustrates the physical properties of the fiberglass mat bats (R-19 insulation rating) produced by the method of this Example.

TABLE III

| Binder Composition Number | % Resin Solids on Fiberglass | Color | Product Thickness Range (uncompressed) (cm.) |
|---|---|---|---|
| A | 4 | W | 17.4–21.2 |
| B | 6 | W | 18.7–22.8 |
| Control | 6 | Y | 19.7–21.3 |

Binder composition A = the formulation described in this Example (4%)
Binder composition B = the formulation described in this Example (6%)
Control = standard industry phenolic binder composition The uncured height of the fiberglass bat was about 29.5–39.7 cm. The mat was cured at 260° C. for one and one-half to two minutes.

PART B

The following fiberglass alternative binder composition of this invention was prepared for use in a fiberglass mat production facility:

| Ingredient | Wt. % |
|---|---|
| 6-HPC | 22.5 |
| Maleic anhydride | 51.0 |
| Potato Starch | 22.5 |
| Glyoxylic acid | 4.0 |

The above formulation designated as Binder Composition C was prepared at a solids level of 40 weight percent and diluted before use to a concentration of 6 percent solids. Silane coupling agent was added prior to use.

The following Table IV illustrates the physical properties of the fiberglass insulation of R-19 fiberglass insulation bats prepared with binder composition C.

TABLE IV

| Binder Composition Number | % Resin Solids on Fiberglass | Color | Estimated Thickness (uncompressed) (cm.) |
|---|---|---|---|
| C | 6 | OW | 15–20 |
| Control | 6 | Y | 20 |

Binder composition C = the formulation described in this Example B.
Control = standard industry phenolic binder composition Although the present invention has been described with reference to certain embodiments, and drawings, it is apparent that modifications and changes may be made therein by those skilled in the art, without departing from the scope of this invention as defined by the appended claims.

We claim:

1. A binder composition comprising an aqueous solution of an unreacted mixture of:
  (i) an at least partially cross-linkable beta-hydroxy urethane functional material and
  (ii) a polycarboxylic acid selected from the group consisting of
    1,2,3,4-butanetetracarboxylic acid (BTCA)
    1,2,3,4-butanetetracarboxylic acid anhydride
    1,2,3,4-cyclopentane-tetracarboxylic acid
    1,2,3,4-cyclopentane-tetracarboxylic acid anhydride
    pyromellitic acid
    pyromellitic anhydride
    maleic acid
    maleic anhydride
    2,3,4,5-tetrahydrofuran carboxylic acid
    2,3,4,5-tetrahydrofuran carboxylic acid anhydride
    and mixtures thereof,
in a beta-hydroxy urethane functional material to polycarboxylic acid weight ratio of from about 4:1 to about 1:5.

2. The binder composition of claim 1 wherein the beta-hydroxy urethane functional material is characterized by the general structural formula:

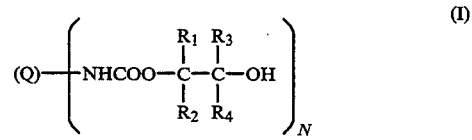

wherein
R1, R2, R3, or R4 may be the same or different and are hydrogen or alkyl radicals, n is an integer of 2 or more and preferably 3 or more, and Q is any molecular backbone having the structure (I) appended to it.

3. The binder composition of claim 1 wherein the beta-hydroxy urethane functional material is selected from
  a. triazine compounds of the formula
    $C_3N_6 (CH_2OR)_{6-x} (CH_2NHCOOR_1)_x$
  b. benzoguanamine compounds of the formula $C_3N_5(C_6H_5)(CH_2OR)_{4-y}(CH_2NHCOOR_1)_y$ c. glycoluril compounds of the formula
$C_4H_2N_4O_2(CH_2OR)_{4-y}(CH_2NHCOOR_1)_y$ d. acetoguanamine compounds of the formula
$C_3N_5(CH_3)(CH_2OR)_{4-y}(CH_2NHCOOR_1)_y$ e. 4,5-dihydroxy-2-imidazolidone compounds of the formula
$C_3H_4N_2O_3(CH_2NHCOOR_1)_2$ f. an oligomer of (a),
g. an oligomer of (b),
h. an oligomer of (c),
i. an oligomer of (d),
j. an oligomer of (e);

wherein the R groups are, independently, hydrogen or alkyl from 1 to 12 carbon atoms, and the $R_1$ groups are, independently, beta-hydroxyalkyl, of from 2 to 18 carbon atoms, alone, or combined with alkyl of from 1 to 18 carbon atoms, x is in the range of from about 2 to 6, and y is in the range of from about 2 to 4.

4. The binder composition of claim 1 wherein the beta-hydroxy urethane functional material is selected from the group consisting of:

a) hydroxypropyl carbamylmethylated melamine
b) hydroxyethyl carbamylmethylated melamine
c) hydroxypropyl carbamylethylated melamine
d) hydroxyethyl carbamylethylated melamine
e) hydroxypropyl carbamylmethylated benzoguanamine
f) hydroxyethyl carbamylmethylated benzoguanamine
g) tetrahydroxypropyl carbamylethylated monochloro triazine
h) tetrahydroxyethyl carbamylethylated monochloro triazine
i) tetrahydroxypropyl carbamylmethylated glycoluril
j) tetrahydroxyethyl carbamylmethylated glycoluril
k) dihydroxypropyl carbamylmethylated dihydroxyimidazolidone
l) dihydroxyethyl carbamylmethylated dihydroxyimidazolidone 5. The binder composition of claim 1 wherein the beta-hydroxy urethane functional material is selected from the group consisting of:

a) hexa(hydroxypropyl carbamylmethylated) melamine
b) hexa(hydroxypropyl carbamylethylated) melamine
c) 1-chloro-3,5-bis(hydroxypropyl carbamylethylated) aminotriazine
d) 1,7-di(hydroxypropyl carbamylethylated) diethylenetriamine
e) 1,10,-di(hydroxypropyl carbamylethylated) triethylenetetraamine 6. The binder composition of claim 1 containing a beta-hydroxy urethane functional material to polycarboxylic acid weight ratio of from 2:1 to 1:4.

7. The binder composition of claim 1 wherein the beta-hydroxy urethane functional material and the polycarboxylic acid in combination constitute from about 50 to 100 weight percent of the total weight of the binder formulation ingredients (exclusive of water).

8. The binder composition of claim 1 containing a rheologically effective amount of a gel time modifier selected from the group consisting of: boric acid and its salts such as ammonium and sodium borates, triethanol amine borates, triethyl amine borates, certain zirconium salts such as ammonium zirconium carbonate, $ZrOCl_2$, certain aldehydes and their acetals such as glyoxal, glyoxylic acid, ethers of acrylamidogylcolic acid and esters including methyl-acrylamidogylcolate methyl ether monomer and amino resins such as melamine-formaldehyde resins and glycoluril such as tetramethylol glycoluril, tetrabutoxymethyl glycolurils, dimethoxydiethoxymethyl glycoluril and such resins in combination with biascrylamidoethyleneglycol, methylolated polyacrlamide, and dimethyloldihydroxyethylene urea.

9. The binder composition of claim 8 wherein the gel time modifier is from about 1 to about 10 weight percent of the total weight of the binder formulation ingredients (exclusive of water).

10. The binder composition of claim 1 containing a flow increasing effective amount of a viscosity modifier.

11. The binder composition of claim 10 wherein the composition contains from about 1 to about 30 weight percent of viscosity modifier based on the total weight of the binder formulation ingredients (exclusive of water).

12. The binder composition of claim 11 wherein the viscosity modifier is selected from urea, dicyanamide, propylene carbonate, ethylene carbonate, ethylene and propylene glycol, polyethylene glycol, and polytetrahydrofuran.

13. The binder composition of claim 1 containing from about 0.1 to about 5 weight percent of an silane adhesion promoter.

14. The binder composition of claim 1 containing a cure promoting catalyst selected from (i) Bronsted acids, (ii) Lewis acids, (iii) alkyl titanates, and (iv) dialkyltin diisothiocyanates.

15. The binder composition of claim 1, wherein the polycarboxylic acid is selected from the group consisting of:
1,2,3,4-butanetetracarboxylic acid (BTCA)
1,2,3,4-butanetetracarboxylic acid anhydride
1,2,3,4-cyclopentane-tetracarboxylic acid
1,2,3,4-cyclopentane-tetracarboxylic acid anhydride
pyromellitic acid
pyromellitic anhydride
and mixtures thereof.

* * * * *